J. J. GOETZ

HEATER

Oct. 6, 1931. Re. 18,218

Original Filed Jan. 12, 1927 2 Sheets-Sheet 1

INVENTOR.

BY Julius J. Goetz.

Morsell, Kenny & Morsell,

ATTORNEYS.

J. J. GOETZ

HEATER

Oct. 6, 1931.

Re. 18,218

Original Filed Jan. 12, 1927

2 Sheets-Sheet 2

INVENTOR.

BY Julius J. Goetz

Morsell, Keeney & Morsell,

ATTORNEYS.

Reissued Oct. 6, 1931 Re. 18,218

UNITED STATES PATENT OFFICE

JULIUS J. GOETZ, OF SHOREWOOD, WISCONSIN, ASSIGNOR TO WESTERN METAL SPECIALTY CO., OF MILWAUKEE, WISCONSIN, A CORPORATION OF WISCONSIN

HEATER

Original No. 1,757,042, dated May 6, 1930, Serial No. 160,630, filed January 12, 1927. Application for reissue filed March 12, 1931. Serial No. 522,116.

This invention relates to an improved fire pot construction especially designed for use in charcoal heaters of the type employed in freight cars and the like containing food products, such as fruits and vegetables, and operating to protect the contents of the car from freezing or damage due to low temperatures.

The invention resides in so constructing and organizing the fire pot that while it is permanently and rigidly mounted as a unit assembly within the heater casing and in operative relation to the feed throat provided between the fire pot and a fuel hopper, the parts thereof, that is, its bottom and side, which are liable to be burned out or damaged are accessible and readily removable for purposes of replacement and repair. Along with these advantages the fire pot construction presents a simple, rigid, durable and compact assembly and one in which effective draft circulation through the fuel in the fire pot is insured.

Other objects and advantages reside in certain novel features of the construction, arrangement and combination of parts which will be hereinafter more fully described and particularly pointed out in the appended claims, reference being had to the accompanying drawings, forming a part of this specification, and in which:

Referring now more particularly to the drawings, it will appear that the heater includes a cylindrically shaped shell or casing 8 formed of corrugated sheet metal and closed at its lower end portion by a bottom 9. Angular members 10 forming legs are riveted to an internal iron ring 10′ which is bolted to the bottom portion of the shell.

Figure 1:
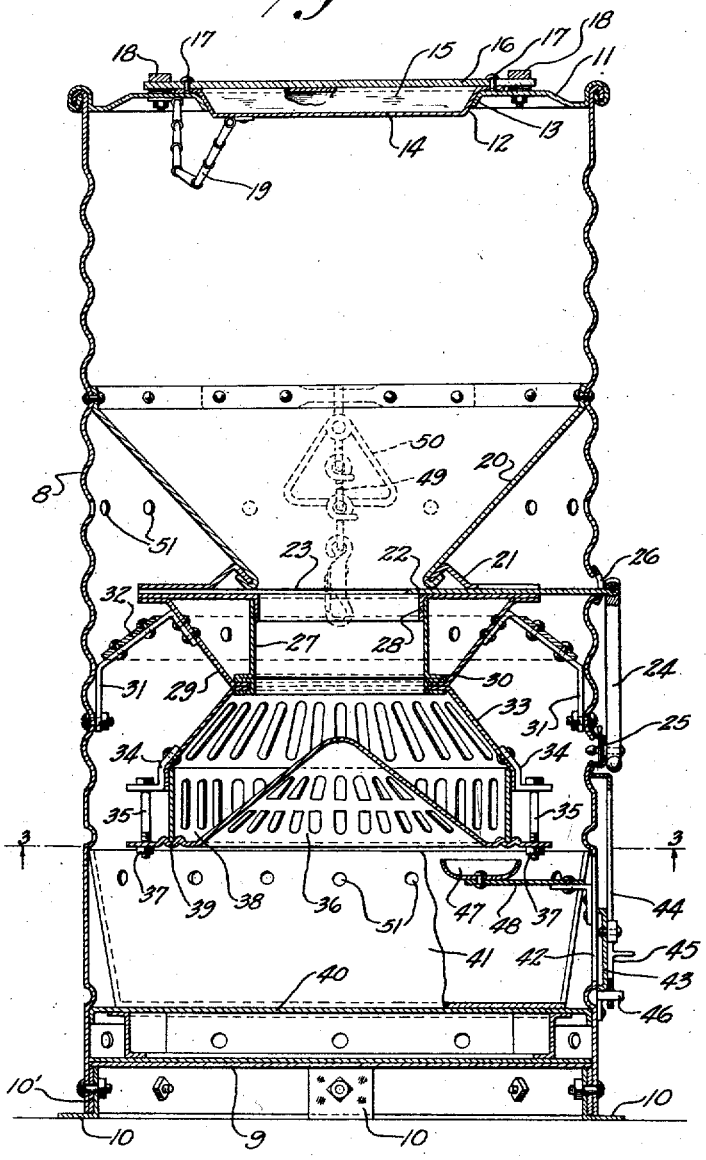
Figure 1 is a vertical sectional view of the improved heater.
Figure 2:
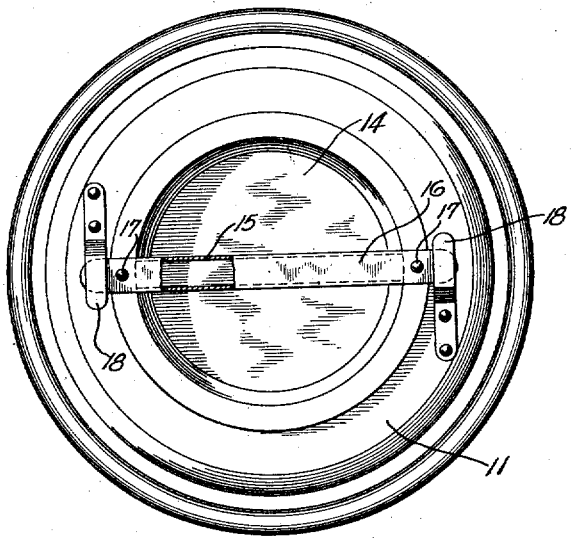
Figure 2 is a plan view thereof.
Figure 3:
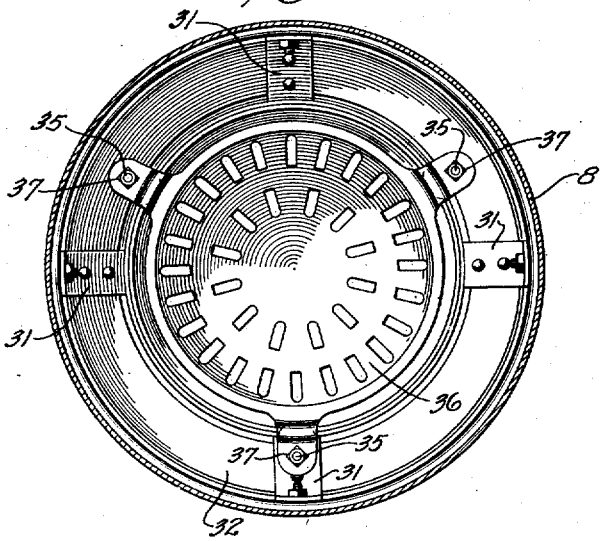
Figure 3 is a cross-sectional view taken on line 3—3 of Figure 1.

The top of the shell is partially closed by a top member 11 whose edge portions are rolled or crimped into engagement with the rolled edge of the shell, as shown in Figure 1. The top member is provided with a medial circular opening 12 of a substantial size. The edges of the top member adjacent the openings are flanged downwardly, as at 13. Said opening 12 is normally closed by a cover 14 having an air-tight engagement with the top member. As shown in Figures 1 and 2, the cover is of a dished formation and is provided on its upper surface within the dished portion with a diametrically extending rib 15 of channel formation. A bar 16 overlies the top of the rib and is welded thereto and projects outwardly from the sides of the cover. The channelled rib, between the bar and cover, prevents distortion of and damage to the cover by the improper insertion of tools. The bar and rib are secured to the cover by rivets 17. The top member 11 is provided with a pair of oppositely disposed lugs 18, which, when the cover is positioned in the opening and turned, engage the projecting ends of the bar 16 to removably lock the cover in position. A chain 19 secured to the cover and to the top member prevents the top from being entirely removed from the heater and lost.

Positioned within the shell, approximately half-way between its extremities, is a downwardly and inwardly inclined funnel-shaped member 20 of sheet metal and forming a hopper. The upper edge portion of the hopper is riveted to the shell, while the lower edge portion of the hopper is crimped into engagement with a member 21 folded to form a slide track for a shut-off plate 22 which is horizontally slidably mounted between portions of the member 21 and is adapted to register with the open lower end portion 23 of the hopper to control the same.

The outer end portion of the shut-off plate 22 has hinged thereto an operating handle 24 which normally hangs in a vertical position, as shown in Figure 1, and is releasably held in this position by a lock 25. To operate the shut-off plate the handle 24 is moved to a horizontal position and then pushed inwardly or withdrawn to open or close the opening 23 by the plate 22, as the case may be. The shell is slotted, as at 26, to permit passage of the handle.

A circular throat member 27 is positioned immediately below the opening 23 of the hopper and said throat member engages the flanged portion 28 of the member 21. The throat member 27 is surrounded by a cone deflector 29 which engages at its upper portion the member 21 and at its lower portion it is crimped into engagement with the throat member, as at 30. Angle pieces 31 are riveted to the cone deflector and bolted to the shell and said angle pieces have secured thereto a circumferential spark deflecting collar 32.

Also crimped at its upper edge portion with the lower portion of the throat member is an apertured, outwardly and downwardly inclined fire pot top member 33, of circular formation. The lower portion of said fire pot top carries brackets 34 which hold bolts 35 which carry in spaced relation a conical grate member 36, the grate being held thereon by nuts 37. A circular, vertically positioned and apertured fire pot side 38 is disposed in a groove 39 in the grate and the upper edge portion of the fire pot side is overlapped by the fire pot top 33.

Below the fire pot and grate and resting on an inner bottom member 40 is an ash pan 41 to receive ashes falling through the grate. Access to the ash pan is afforded by means of an opening 42 in the lower portion of the shell, normally closed by means of a vertically slidable door 43 movable in a door runner 44. The door is normally held in closed position by a pivoted catch 45 adapted to engage a lug 46.

When the door is raised to open position, a lighter 47, mounted on a pivotal, horizontal arm 48 may be moved outwardly through the door opening and when so moved the lighter will also serve to hold the door in open position. The lighter is adapted to contain readily inflammable material for the purpose of igniting fuel within the fire pot.

A chain 49, carrying a triangular toggle 50, is secured to the outer surface of the shell, and the same is used in handling the heater. It should also be observed that the casing or shell, at desired places, is formed with a plurality of spaced apertures 51 to permit the escape of heat.

In use, fuel, preferably charcoal, is disposed within the hopper of the heater and the fuel is automatically fed by gravity into the fire pot, the speed of feeding being controlled by the adjustable shut-off plate 22. Fuel in the fire pot is ignited by means heretofore explained and the ashes of the spent fuel fall through the grate into the ash pan. Sparks from the fuel are deflected and arrested by the cone deflector 29 and the collar 32 and cannot escape from the shell. If the fire pot side at any time requires removal for replacement or repairs, it can be readily removed by removing the nuts 37 and dropping the grate 36.

By virtue of the crimping of the upper edge of the fire pot top member 43 to the lower end of the throat, the fire pot top is permanently organized with the throat and also with the feed hopper through the throat. Further, the entire fire pot structure when assembled is suspended as a unit from the throat. The fire pot assembly is rigid and strong due to the manner of interconnecting and organizing the parts and yet the bottom and side may be readily removed for purposes of replacement or repair. The problem of closely organizing and properly securing the sections of the fire pot together is aggravated by the downwardly and outwardly flaring formation of the top 33 and yet this downward and outward formation is desirable inasmuch as it aids in the draft circulation, the air flowing in through the openings or slots of the bottom and sides and out through the slots of the perforated top, thereby insuring proper combustion. However, by suspending the top permanently from the throat and interconnecting the side with the top and bottom and having the connecting fasteners or bolts between the bottom and the top a very effective and simple solution of the problem is had.

From the foregoing description it will be seen that the improved freight car heater is of very simple and novel construction and is well adapted for the purposes described.

The invention claimed is:

1. In a car heater, a feed throat, a fire pot and grate assembly adapted to be suspended as a unit upon the feed throat and comprising a fire pot body having a downwardly and outwardly flaring and perforated top formed at its upper end with an attaching and supporting flange adapted to be permanently interconnected with the lower end of the feed throat, said fire pot body also including a side having its upper portion interconnected with the lower end of the top, a grate having supporting engagement with the lower end of the side of the fire pot body, and releasable fastening devices extending between the top and the grate.

2. In a car heater, a feed throat, a fire pot and grate assembly adapted to be suspended as a unit upon the feed throat and comprising a fire pot body having a top formed with means adapted to be secured to the feed throat to support the assembly in position in the heater, said top being perforated and flaring downwardly and outwardly, said fire pot body also including a side extending downwardly from the top and a grate having supporting engagement with the lower end of the side and itself supported by the top of the fire pot body.

3. A fire pot and grate unit assembly for use with car heaters and comprising a fire pot body, a grate including an upwardly directed conical portion projecting up into the body of the fire pot and an outwardly directed flange, the lower end of the fire pot and said flange having inter-engaging means positively securing the grate and fire pot body against relative transverse movement and relative axial movement in one direction and releasable fastening means for holding the grate and the fire pot body against relative axial movement in the other direction.

4. A fire pot and grate unit assembly for use with car heaters and comprising a fire pot body, a grate having an outwardly directed flange engaged with the lower end of the body of the fire pot to limit upward movement of the grate, said flange having a crimp engageable with the body of the fire pot to prevent relative transverse movement of the grate and fire pot body and releasable fastening means for holding the flange and crimp engaged with the body of the fire pot.

5. In a car heater, a feed throat, a fire pot and grate unit assembly comprising a fire pot body having its top formed with means adapted to engage the feed throat of the heater to support the fire pot and grate assembly in position in the heater, and a grate disposed at the lower end of the fire pot body, and releasable supporting connection between the grate and the fire pot body.

6. In a car heater, a feed throat, a fire pot and grate unit assembly comprising a fire pot body having its top formed with an attaching and supporting flange engageable with the feed throat for supporting the fire pot and grate assembly in position in the car heater, and a grate coacting with and supported by the fire pot body.

7. In a heater of the character described, a fire pot including a fire pot body having an upper section flaring downwardly and outwardly and terminating in a downturned flange, and a side section of annular form having its upper end in telescoping engagement with the flange of the top section, a grate having an outturned flange engageable with the lower end of the side section, and releasable fastening means extending between the top section and the grate for securing the parts in assembly.

8. In a heater, a sectional and readily detachable and removable fire pot comprising a downwardly and outwardly inclined fire pot top, brackets carried by the lower periphery of said fire pot top, a conical grate member disposed below said fire pot top, said grate member having an annular grooved flange, bolts extending from said brackets through said flange, and a circular, vertically positioned fire pot side having its lower edge disposed within the groove of said flange and supported by the grate member and overlapping at its upper edge portion the lower edge portion of said fire pot top.

9. In a charcoal burner, an outer shell, a cover therefor, a magazine within the shell, a cylindrical guide depending from the magazine, a perforated upper grate secured to and flaring outwardly from the bottom of the guide, a lower grate, a perforated cylindrical wall between the lower and the upper grate and bolts secured to the upper grate and adapted to clamp the cylindrical wall between the lower and upper grates.

10. In a charcoal burner, an outer corrugated shell, a cover therefor, a magazine, the bottom of which flares inwardly, a cylindrical guide depending from the bottom of the magazine, an upper grate secured to and flaring outwardly and downwardly from the guide, a conical lower grate, a perforated cylindrical wall between the said grates and bolts passing through the grates and clamping the cylindrical wall therebetween.

11. In a charcoal burner, a shell, a cover therefor, means for clamping the cover to the shell, a magazine having a conically shaped bottom, a cylindrical guide, a bottom grate of conical form, a perforated cylindrical wall between the grates, means passing through the edges of the grates to clamp the wall therebetween, and baffle means adapted to guide air through a tortuous path from the bottom of the shell through perforations near the top thereof.

12. A charcoal burner according to claim 11 having brackets extending from the side walls to support the upper grate and a baffle flaring upwardly and outwardly from the bottom of the guide and terminating in a flange spaced from the shell.

In testimony whereof, I hereto affix my signature.

JULIUS J. GOETZ.